July 3, 1951  G. HASTINGS  2,559,427
DETACHABLE ROAD ROLLER
Filed Nov. 2, 1945  3 Sheets-Sheet 1
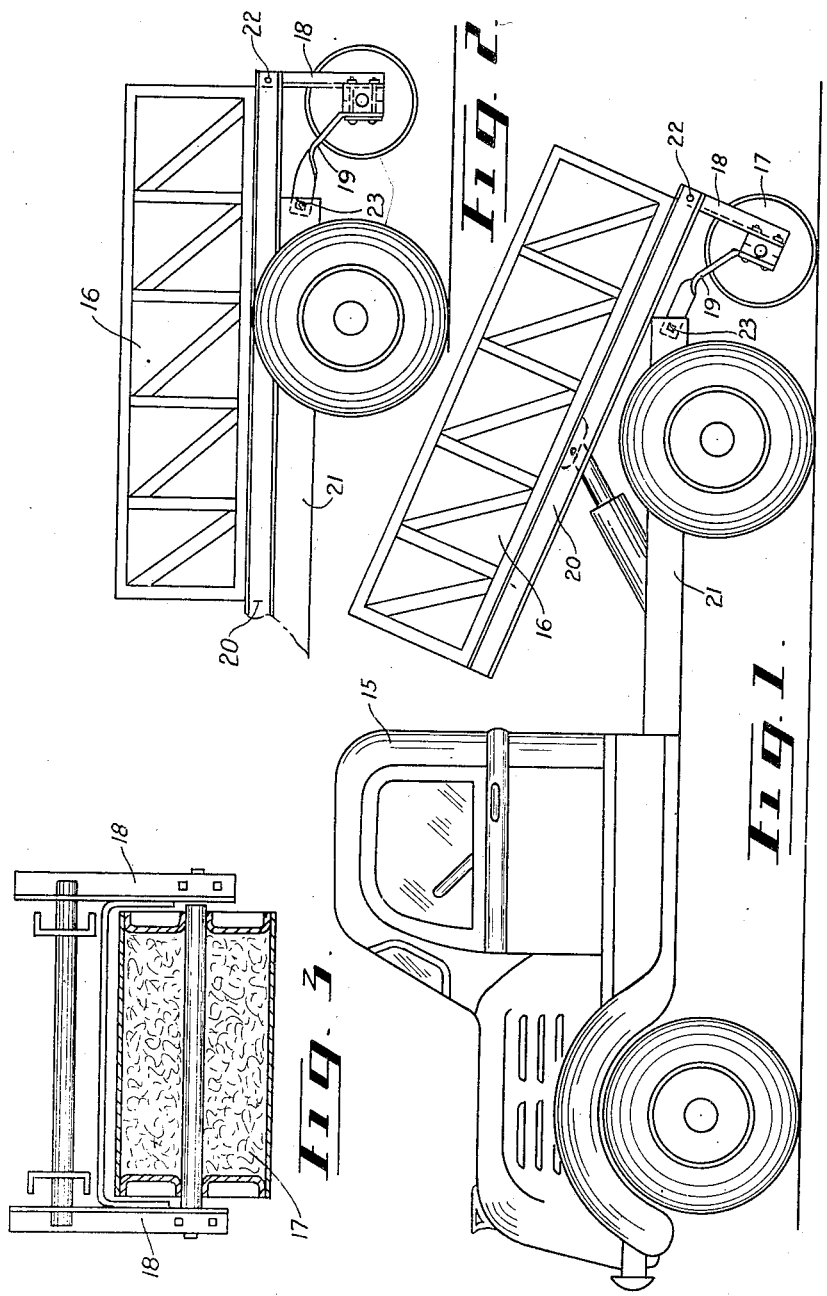
INVENTOR.
George Hastings, July 3, 1951 G. HASTINGS 2,559,427
DETACHABLE ROAD ROLLER
Filed Nov. 2, 1945 3 Sheets-Sheet 2

INVENTOR.
George Hastings
BY
Atty.

July 3, 1951
G. HASTINGS
2,559,427
DETACHABLE ROAD ROLLER
Filed Nov. 2, 1945
3 Sheets-Sheet 3
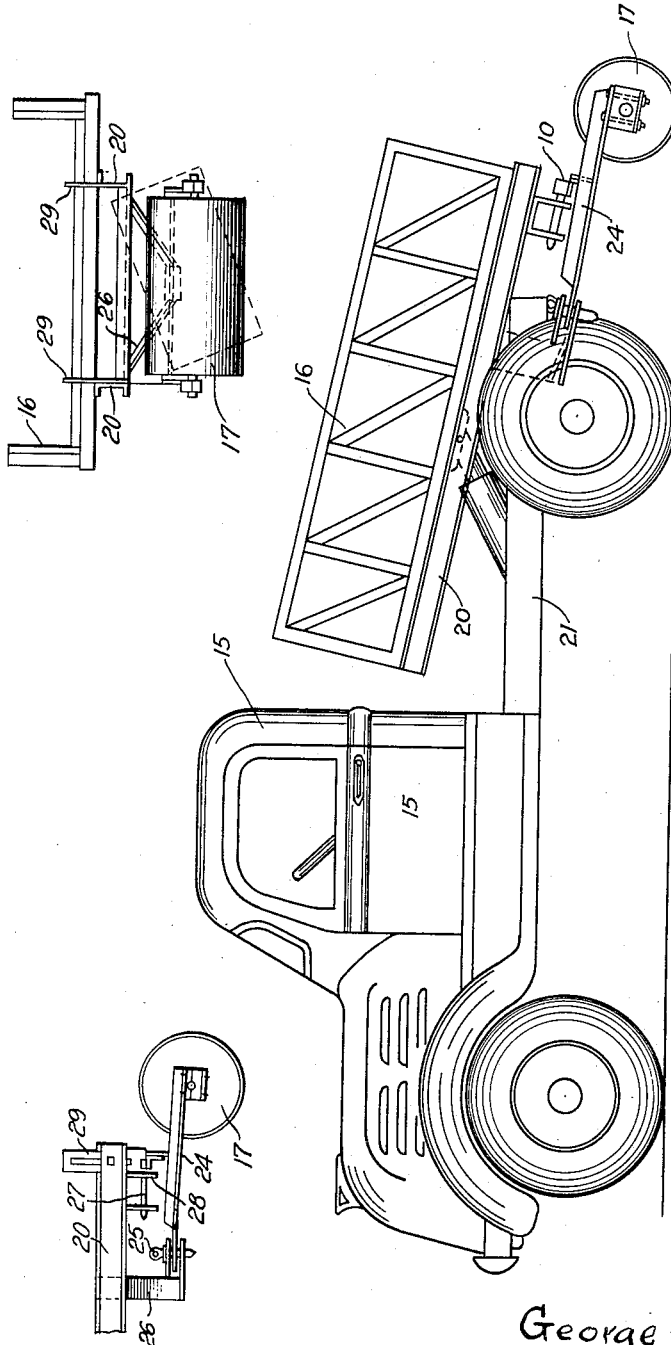
INVENTOR.
George Hastings,
BY
Frank O. Parker
Atty.

Patented July 3, 1951

2,559,427

UNITED STATES PATENT OFFICE 2,559,427

DETACHABLE ROAD ROLLER

George Hastings, New Liskeard, Ontario, Canada

Application November 2, 1945, Serial No. 626,337

2 Claims. (Cl. 94—50)

This invention relates to road working equipment such as rollers, and more particularly to equipment which may be attached to heavy duty trucks, preferably of the type having hydraulically operated dump bodies.

Road working equipment is required to roll relatively solid surfaces and an essential characteristic for efficient operation is that sufficient weight or pressure be available to effect the operation. In machinery designed for this purpose the weight is built into the machine as exemplified by steam driven rollers. Such characteristic is not an inherent part of ordinary trucks which are limited to a weight commensurate with their load carrying capabilities.

It is for this reason that prior developments in the art to which this invention relates have failed. That is to say, road equipment attached to trucks have heretofore not been capable of attaining sufficient weight to function efficiently.

This invention obtains the necessary pressure by utilizing the force exerted by the hydraulic jack normally employed to effect the raising and lowering of the dump body of the truck. This force exerted by the jack is capable of developing tremendous pressure on the roller as will hereinafter be explained in detail. Thus, by means of the invention a relatively light unit easily transported with and as part of a truck may be made to function as road working equipment in a manner equal to much heavier equipment. The load weight in the body and the truck weight are utilized through the medium of the hydraulic jack to distribute the load on the road working equipment which in the present instance is hereinafter shown and described as a road roller.

The principal object of the invention is to provide an attachable roller which is capable of being mounted on a dump truck to effect the work for which it is designed and to utilize the hydraulic jack employed to raise the dump body to effect a pressure on the roller.

A further object of the invention resides in having the road working equipment mounted on a dump truck having hydraulic mechanism for lifting the body and its load whereby the weight of the load and pressure of the hydraulic mechanism will exert a force on the road working equipment such as a roller to cause the same to be maintained in contact with the surface of the ground under great pressure.

With these and other objects in view that may appear while the description proceeds the invention consists in the novel construction and arrangement of parts as hereinafter more specifically set forth, claimed and shown in the accompanying drawings forming part of this application and in which:

Fig. 1 of the drawings represents a dump truck with the roller attached in working position;

Fig. 2 of the drawings represents the body part of same truck with the roller raised from the ground to move from place to place without contacting the road surface;

Fig. 3 is a rear view of the roller shown in Figs. 1 and 2, showing detail construction of the roller and mounting;

Fig. 5 shows a modified form with the roller in working position;

Fig. 6 shows a rear view of the modified form of roller mounting; and

Fig. 7 shows a side view of the modified roller mounting.

Figure 4:
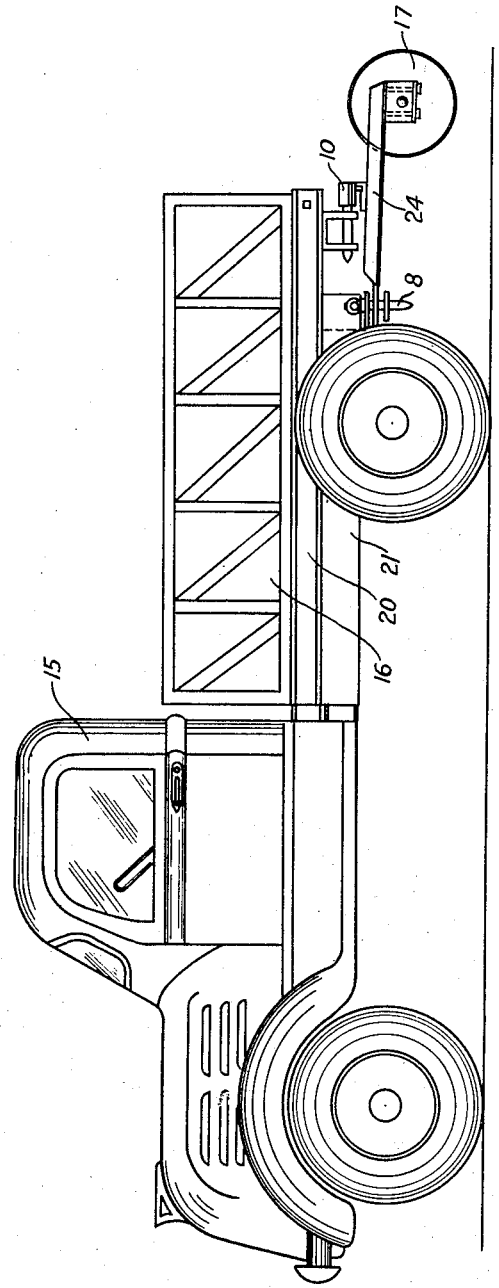
Fig. 4 shows a modified form showing the roller off the ground.

Referring more in detail to the drawings in which similar reference characters designate corresponding parts throughout the several views it will be seen the invention comprises a truck 15 having a hydraulically operated dump body 16, said body being hinged on an axis transversely to the truck at the rear ends of the sills 21. The sills 20 of the dump body extend beyond the sills 21 of the truck frame.

A roller mounting is suspended from the rear extension of the body supporting sills 20. Upright members 18 consisting of angle or channel bars are fastened to the body supporting sills 20 by means of a rod 22 extending beyond the sills 20 and protruding through apertures formed in each upright member 18. The two ends of rod 22 may be threaded and nuts threaded thereon to prevent said rod from being withdrawn therefrom until it is the intention of the operator to do so.

The lower extremities of the upright members 18 are fastened by means of bolts to the bearings supporting the shaft of the roller 17. Brace bars 19 have one end securely fastened to the rear extremity of the body supporting sills 20 and their other extremity secured to the roller bearings.

As may be seen in Fig. 3 of the drawing the inside of roller 17 may be filled with concrete, sand, water or any other suitable substance, thus giving additional weight to the device.

In the modified form shown in Figs. 4, 5, 6, and 7 the frame 24 supporting the roller 17 is mounted in a horizontal plane with one end connected to a draft beam 26 by a coupling pin 25. The frame 24 is suspended from the dump body by a horizontal pivot pin 27 journaled in bearing lugs 28 which permits angular adjustment of the frame.

It is believed that the construction and advantages of the device may be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

What I claim is:

1. A road working machine comprising a truck, a dump body hingedly mounted on the truck on an axis transversely to the truck having its rear end extending beyond the end of the truck, an auxiliary frame, means pivotally suspending said auxiliary frame beneath the rear end of said dump body on an axis longitudinally to the truck, and pressure means for elevating the forward end of said dump body and depressing the rear end to exert a downward pressure on the auxiliary frame, and a road working unit mounted in said auxiliary frame for engagement with the ground.

2. A road working machine comprising a truck having a frame, a dump body pivotally mounted on an axis transversely to the truck frame having its rear end extending beyond the end of the truck, an auxiliary frame disposed beneath the rear end of said dump body, means loosely connecting the forward end of said auxiliary frame to said dump body, a shaft longitudinally of said dump body, means pivotally suspending said auxiliary frame from said shaft to permit lateral rocking movement, a road working unit mounted on said auxiliary frame for engagement with the ground, and pressure operated means for tilting said body and exerting a direct downward pressure on said working unit.

GEORGE HASTINGS.

REFERENCES CITED

The following references are of record in the file of this patent:

UNITED STATES PATENTS

| Number | Name | Date |
|---|---|---|
| 1,885,468 | Nevin | Nov. 1, 1932 |
| 2,386,025 | Wills | Oct. 2, 1945 |
| 2,445,472 | Butch | July 20, 1948 |